United States Patent

Orillo et al.

(10) Patent No.: US 10,604,290 B2
(45) Date of Patent: Mar. 31, 2020

(54) CARTONING MACHINE

(71) Applicant: I.M.A. INDUSTRIA MACCHINE AUTOMATICHE S.P.A., Ozzano dell'Emilia (IT)

(72) Inventors: Antonio Orillo, Castel San Pietro Terme (IT); Pierpaolo Di Maio, Castel San Pietro Terme (IT)

(73) Assignee: I.M.A. Industria Macchine Automatiche S.p.A. (IT)

( * ) Notice: Subject to any disclaimer, the term of this patent is extended or adjusted under 35 U.S.C. 154(b) by 260 days.

(21) Appl. No.: 15/546,459

(22) PCT Filed: Jan. 25, 2016

(86) PCT No.: PCT/IB2016/050361
§ 371 (c)(1),
(2) Date: Jul. 26, 2017

(87) PCT Pub. No.: WO2016/120778
PCT Pub. Date: Aug. 4, 2016

(65) Prior Publication Data
US 2017/0369195 A1 Dec. 28, 2017

(30) Foreign Application Priority Data

Jan. 26, 2015 (IT) .............................. BO2015A0023

(51) Int. Cl.
*B65B 59/00* (2006.01)
*B65B 35/20* (2006.01)
(Continued)

(52) U.S. Cl.
CPC .............. *B65B 59/005* (2013.01); *B65B 5/06* (2013.01); *B65B 35/205* (2013.01); *B65B 35/30* (2013.01);
(Continued)

(58) Field of Classification Search
None
See application file for complete search history.

(56) References Cited

U.S. PATENT DOCUMENTS 4,558,779 A    12/1985  Schmidt et al.
5,072,573 A *  12/1991  Tisma .................. B65B 35/205
                                              198/803.9
(Continued)

FOREIGN PATENT DOCUMENTS

CN            1190939 A    8/1998
CN          102123914 A    7/2011
(Continued)

*Primary Examiner* — Hemant Desai
*Assistant Examiner* — Amelia J. I. Vorce
(74) *Attorney, Agent, or Firm* — Laubscher & Laubscher, P.C.

(57) ABSTRACT

A cartoning machine for packaging one or more products in a respective carton includes a product conveyor for conveying the products along an advancement direction, a transport device for transporting the carton along a transport path, an insertion zone wherein the products face an aperture of the carton and are inserted into the carton. The product conveyor includes a first belt on which first edges are mounted and a second belt on which second edges are mounted, each first edge defining with a respective second edge a pair of containment edges of the products. A mutual position of the first belt and of the second belt is adjustable so as to adjust accordingly a distance between the first edges and the second edges to adapt the pair of containment edges to a dimension of the products. The product conveyor further includes a first cam path and a second cam path, each first edge including a first cam follower engaging the first cam path and each second edge including a second cam follower engaging the second cam path, such that the first edges and the second edges are movable transversely to the advancement direction towards the carton at the insertion zone.

15 Claims, 7 Drawing Sheets

(51) Int. Cl.
*B65B 43/42* (2006.01)
*B65G 17/48* (2006.01)
*B65G 15/42* (2006.01)
*B65B 5/02* (2006.01)
*B65G 17/42* (2006.01)
*B65B 5/06* (2006.01)
*B65B 35/30* (2006.01)
*B65B 5/04* (2006.01)

(52) U.S. Cl.
CPC ............ *B65B 43/42* (2013.01); *B65B 5/02* (2013.01); *B65B 5/04* (2013.01); *B65G 15/42* (2013.01); *B65G 17/42* (2013.01); *B65G 17/48* (2013.01)

(56) References Cited

U.S. PATENT DOCUMENTS

| | | | |
|---|---|---|---|
| 5,175,976 A | 1/1993 | Petry et al. | |
| 5,185,984 A | 2/1993 | Tisma | |
| 5,452,568 A * | 9/1995 | Tisma | B65B 35/205 53/252 |
| 5,996,310 A | 12/1999 | Bailey et al. | |
| 6,374,997 B1 * | 4/2002 | Spadafora | B65G 47/965 198/473.1 |
| 6,889,485 B2 * | 5/2005 | Davaillon | B65B 21/06 198/418.7 |
| 7,331,156 B2 * | 2/2008 | Hartness | B65G 17/323 198/470.1 |
| 7,621,109 B2 * | 11/2009 | Momich | B65B 35/205 53/252 |
| 8,826,633 B2 | 9/2014 | Buse et al. | |
| 9,309,017 B2 * | 4/2016 | Langen | B65B 5/024 |
| 2011/0152050 A1 | 6/2011 | Häfker et al. | |

FOREIGN PATENT DOCUMENTS

| | | |
|---|---|---|
| CN | 102892686 A | 1/2013 |
| DE | 1145095 B | 3/1963 |
| GB | 1231756 | 5/1971 |
| IT | 1340590 | 4/2004 |
| JP | S4952969 U | 5/1974 |

* cited by examiner

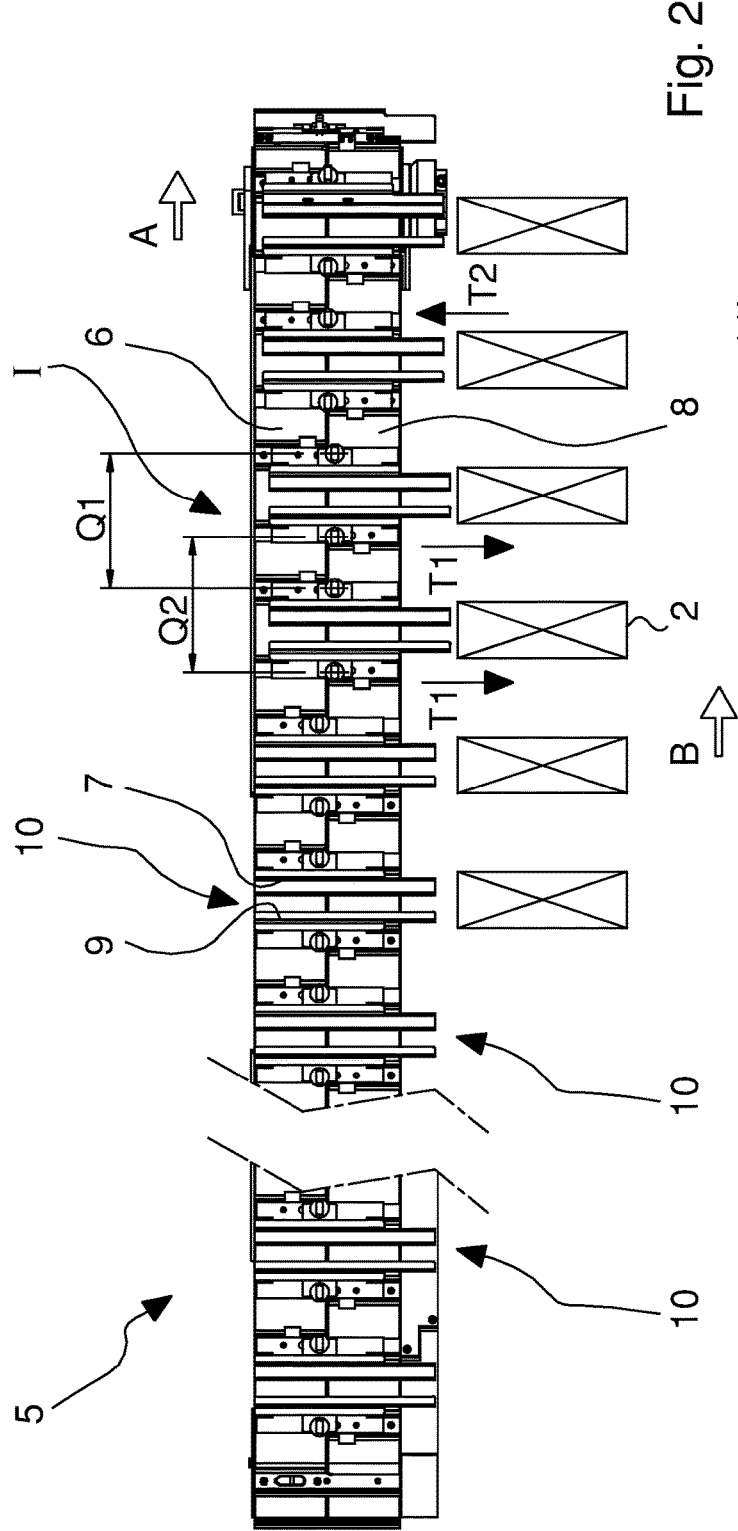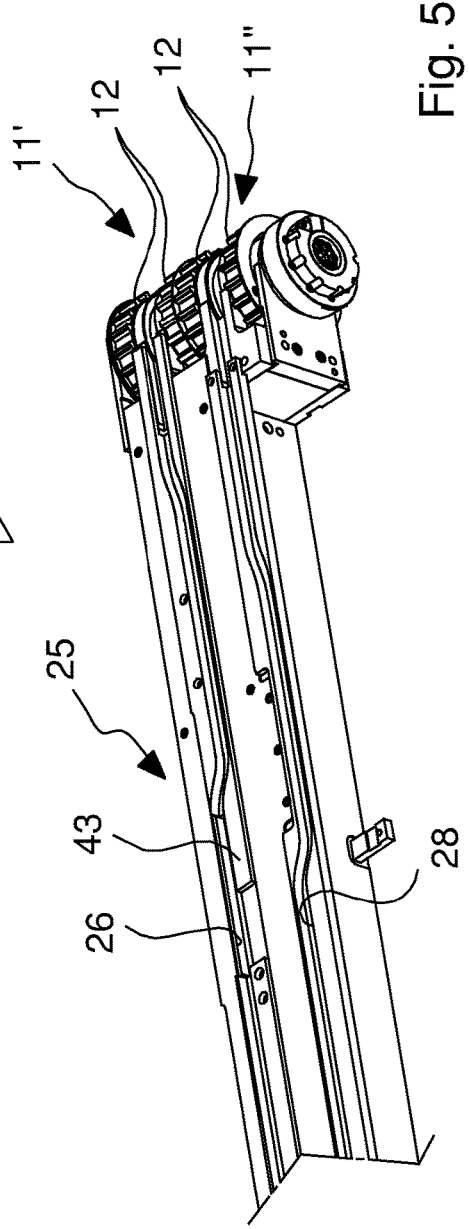

CARTONING MACHINE

CROSS-REFERENCE TO EARLIER APPLICATION

This application is a § 371 National Stage Entry of PCT/IB2016/050361 filed Jan. 25, 2016 entitled "Cartoning machine." PCT/IB2016/050361 claims priority to IT-BO2015A000023 filed Jan. 26, 2015. The entire content of these applications are herein incorporated by reference in their entirety.

TECHNICAL FIELD

The invention relates to the field of packaging machines, in particular it relates to a cartoning machine for packaging one or more products, which may be different from one another in shape and dimensions, such as, for example, blister packs, phials, syringes, bottles, tubes, or similar, inside a single carton.

BACKGROUND OF THE INVENTION

In cartoning machines of known type different transport devices are generally provided for each of the objects to be transported, in particular for the cartons and for the products to be inserted into the cartons. The carton, which generally has the shape of a cardboard sleeve that is open at the ends, is increased in volume from a flat configuration, is transported so as to have an aperture arranged facing the products to be packaged, which are in turn transported so as to face the aperture of the respective carton or sleeve into which they have to be inserted. A pusher pushes the product from a side opposite the carton until the product enters the carton through the aperture, which is then closed. The transport device that moves the products includes a conveyor provided with a belt on which edges are mounted that are equidistant from one another and between which the product is positioned.

The cartoning machines disclosed above are hardly versatile because they do not allow objects to be transported that have dimensions other than the preset dimensions. In fact, if it is desired to change the width of the products, all the edges have to be dismantled from the belt of the respective transport device and be remounted spaced apart by a space that is suitable for the new size, this causing a huge loss of time.

Alternatively, the entire belt has to be changed with a belt having edges of the desired distance, this being extremely costly.

IT1340590 proposes a technical solution for a transport device for packages in which the latter are retained between a plurality of ridges, the mutual distance of which can be modified. The ridges are mounted on a pair of parallel belts. On a first belt first ridges are mounted that interact with a first face of the package and on the second belt of the pair second ridges are mounted that interact with a second face of the package opposite the first face. In each winding zone, the two belts are supported by respective pulleys mounted on the same shaft. Being able to adjust the angular position of a pulley in relation to a belt with respect to the other pulley, it is possible to modify simultaneously and equally the mutual distance between all the first ridges and all the respective second ridges, this enabling a size adjustment on the basis of the width of the package to be transported.

The solution of IT1340590 is provided for a conveyor of packages, i.e. objects that rest on the transport device to receive a product internally.

In known cartoning machines the products are transferred from the product conveyor to inside the respective carton by the pusher. In addition to having a certain flexibility according to the basis of the size of the product, the cartoning machines are required to provide systems that enable the product to be transferred correctly to the carton.

It is known that the shape of the products can affect the outcome of cartoning. In fact, the products may have curved, tapered surfaces with pointed regions. When the transfer inside the carton is performed by the pusher, the product slides on the surface of the product conveyor to the inside of the carton. During sliding, the product, owing to the shape thereof, may jib and rotate, reaching the aperture of the carton in an incorrect position, which may cause undesired deformation of the carton or which even prevents the product from entering the carton, also damaging the carton. There is also the risk that a product may not reach the carton and may fall outside the carton, leaving the package empty.

The risk of incorrect or lack of insertion is also greater when it is desired to insert into the same carton a plurality of products, possibly of different shape and dimensions from one another.

SUMMARY OF THE INVENTION

One object of the present invention is to improve known cartoning machines. Another object is to provide a cartoning machine that enables to meet the above needs, in particular to have a certain flexibility of use and to be reliable during insertion into the cartons.

Another object is to obtain a cartoning machine that is able to package a plurality of products, which are possibly different by shape and dimensions, in the same carton, limiting or even avoiding the risk of incorrect insertion of the products into the carton.

According to the invention a cartoning machine is provided for packaging one or more products in a respective carton as disclosed in claim 1.

BRIEF DESCRIPTION OF THE DRAWINGS

The invention can be better understood and implemented with reference to the attached drawings that illustrate an embodiment thereof by way of non-limiting example in which:

FIG. 2 is a fragmentary plan view of a product conveyor provided in the cartoning machine;

FIG. 5 is an enlarged and fragmentary perspective top view of an inner part of the product conveyor of FIG. 2 showing an arrangement of cams provided in said conveyor;

DETAILED DESCRIPTION

Figure 1:
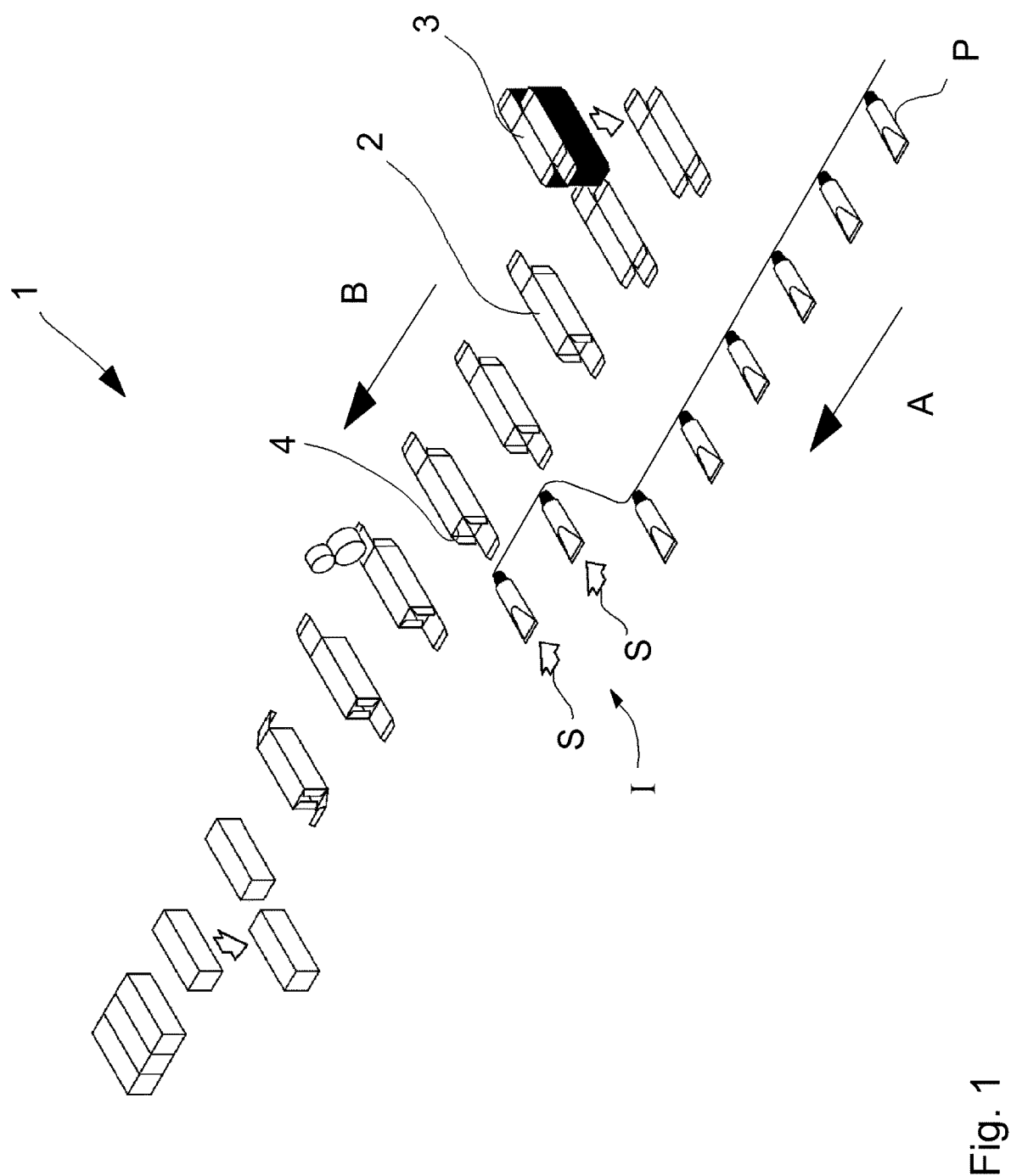
FIG. 1 is a schematic view of the work flow of a cartoning machine according to an embodiment of the invention.

FIG. 1 shows schematically the work flow of a cartoning machine 1 for packaging the products P, such as, for example, blister packs, phials, syringes, bottles, tubes or a combination thereof, in a respective carton 2.

In the cartoning machine 1 the products P to be packaged advance along an advancement direction A arranged at a preset distance from one another. The cartons 2, into which the products P have to be inserted, run along a transport path B, and are also spaced apart from one another according to a certain pitch. The advancement of the products P and of the cartons 2 can be continuous or indexed.

The cartons 2 are, for example, carton blanks, an edge of which is pre-glued, which are taken from a stack 3 in which they have a flat configuration, are brought to volume in the cartoning machine 1 to take on the shape of a sleeve open at the ends. The carton 2 is conveyed so as to have an aperture 4 arranged frontally to the products P to be packaged, which are in turn conveyed to an insertion zone I of the cartoning machine 1 in which they face the aperture 4 of the respective carton 2. In the insertion zone I, a pusher indicated schematically by the arrow S, presses the product P from a side opposite the carton 2 until it inserts the product P into the carton 2 through the aperture 4. The latter is then closed by folding end flaps of the blank. The product P is defined not only as a single product or object like the tube in FIG. 1, but also as a plurality or a group of products or objects, each group of products or objects P being maintained at a preset distance by a group of products or objects that is subsequent and moved along the advancement direction A. Each group of products P may include objects that are the same as one another or different in shape and size, maintained alongside and grouped together during motion along the advancement direction A, so as to be able to be inserted into the same carton 2 through a single action of the pusher S. For example, a bottle and a vial or a syringe and a vial can be inserted into the same carton 2. The number and type of products and the combination thereof to be introduced into the single carton 2 can vary widely.

In a manner that is known and not shown, together with the products P a leaflet or instruction sheet that has been suitably folded into a strip can be inserted into the carton 2. In this case, the cartoning machine 1 can include a transport assembly dedicated to the latter and gripping elements for insertion thereof into the carton 2; in particular, in the insertion zone I, the transport assembly and/or the gripping elements can be interposed between the products P and the cartons 2.

With reference to FIG. 2, the cartoning machine 1 includes a product conveyor 5 for conveying the products P along the advancement direction A and a transport device of known type, which is not shown, for transporting the cartons 2 along the transport path B. In the insertion zone the transport path B has a part that is substantially linear and parallel to the advancement direction A and the products P and the cartons 2 advance at the same speed.

The product conveyor 5 includes a plurality of pairs of containment edges 10 that are mounted on distinct and adjacent belts 6, 8. In particular, the product conveyor 5 includes a first belt 6 on which first edges 7 are mounted and a second belt 8 on which second edges 9 are mounted arranged alternately with the first edges 7. The first edges 7 are mounted parallel to one another in succession on the first belt 6 according to a constant pitch Q1 that is the same as the pitch Q2 with which the second edges 9, which are also parallel to and equidistant from one another, are mounted on the second belt 8. The first edges 7 and the second edges 9 can be of the same length (as in the illustrated embodiment) measured transversely to the belts 6, 8, this length being greater than the total length of the adjacent two belts 6, 8, or of different lengths. The products P to be packaged are interposed between each first edge 7 and the respective second edge 9, which together define one of the pairs of containment edges 10.

Near the ends of the product conveyor 5, the first belt 6 and the second belt 8 are wound in a loop around respective first pulleys 11' and second pulleys 11" (FIG. 5, where only a first pulley 11' and only a second pulley 11" are visible), which are coaxial. The first pulleys 11' that move the first belt 6 and the second pulleys 11" that move the second belt 8 can be made independent so as to be able to vary a step thereof or mutual angular position. In other words, with the cartoning machine 1 stationary, it is possible to rotate the first pulleys 11' of the first belt 6, maintaining the second pulleys 11" of the second belt 8 stationary, so as to adjust a position of the first belt 6 with respect to the second belt 8, in particular according to a direction that is parallel to the advancement direction A. In this manner, the distance between the first edges 7 and the second edges 9 is adjusted consequently so as to adapt all the pairs of containment edges 10 to a different size or overall dimensions of the products P to be conveyed and retained within the edges 7, 9. In an alternative embodiment, it can be the second belt 8 that is adjusted maintaining the pulleys of the first belt 6 stationary.

Each of the first pulleys 11' and of the second pulleys 11" includes teeth 12 aligned between one another in two rows spaced along the axis of the same wheel to engage corresponding two rows of teeth 13 (FIG. 4) present in each belt 6, 8. Naturally, for each pulley or belt a sole row of teeth may be present or a number of rows of teeth that is greater than two.

Figure 3:
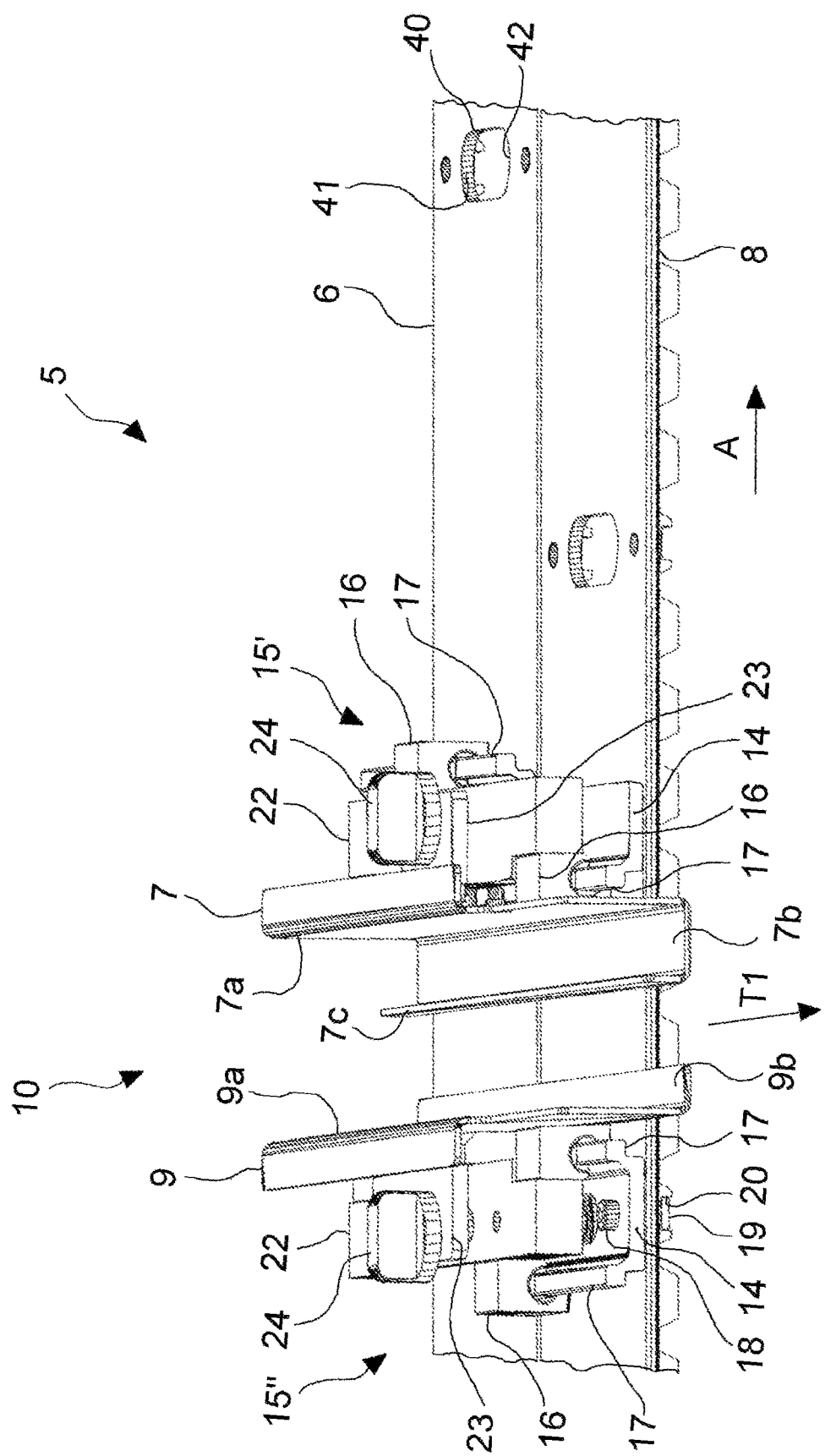
FIG. 3 is an enlarged and fragmentary perspective top view of a portion of the product conveyor of FIG. 2 showing a pair of containment edges and in which other pairs of containment edges are removed.

As FIG. 3 shows, the first edge 7 and the second edge 9 include respectively a first containing wall 7a and a second containing wall 9a, in particular substantially vertical walls, which bound a space occupied by the products P on the product conveyor 5. Depending on the type of product P to be packaged, i.e. according to the shape, dimensions and number of products to be interposed between the first edge 7 and the second edge 9, the latter can have a different shape from one another and have containing walls (7a, 9a) that are tilted with respect to the vertical and are suitably shaped, and additional auxiliary walls, for example for supportingly receiving and retaining the products P. In particular, base walls 7b and 9b can be provided, which in the example in FIG. 3 have a different width, and an appendage 7c protruding from the base wall 7b, found in the illustrated example only on the first edge 7, to retain between the edges 7, 9 a plurality of products, for example a vial resting on the base wall 7b together with another product. Alternatively, only one base wall in one of the two edges 7, 9 may be present, on which the various transported products rest, or also, in the absence of auxiliary walls, the products P rest directly on the belts 6, 8 and are retained between the edges 7, 9 by the first 7a and by the second containing wall 7b during the motion of the belts 6, 8. If a base wall is present, it is arranged above the belts 6, 8.

Still with reference to FIG. 3, the first edge 7 and the second edge 9 are connected to a supporting body 22 via a protrusion 23 mounted on the back of each first and second containing wall 7a and 9a. The protrusion 23 is retained on the supporting body 22 by a knob 24, having a threaded stem that traverses a recess made in the protrusion 23 and reaches the supporting body 22 onto which it is screwed. The first edge 7 and the second edge 9 can thus easily be dismantled and replaced with edges of different shape and size simply by unscrewing the respective knob 24.

As shown schematically in FIG. 1 and as will be detailed below, to promote the insertion of the products P into the cartons 2, in the insertion zone I the first edge 7 and the second edge 9 are brought near the corresponding carton 2 so as to reduce the space between the carton 2 and the edges (7, 9) when the product P is inserted into the carton 2, i.e. during the action of the pusher S.

As disclosed in detail below, the first edge 7 and the second edge 9 can be brought near the carton 2 simultaneously (i.e. in a synchronized step), or at different times, one edge after the other. In other words, the first edges 7 are moveable transversely to the advancement direction A independently of the second edges 9 and vice versa.

The products P can be brought near the respective carton 2 by virtue of the fact that the first edge 7 and the second edge 9 are moveable transversely to the advancement direction A, along an approach direction T1, (FIG. 2), in the insertion zone I of the cartoning machine 1 and along a removal direction T2 beyond the insertion zone I.

Figure 4:
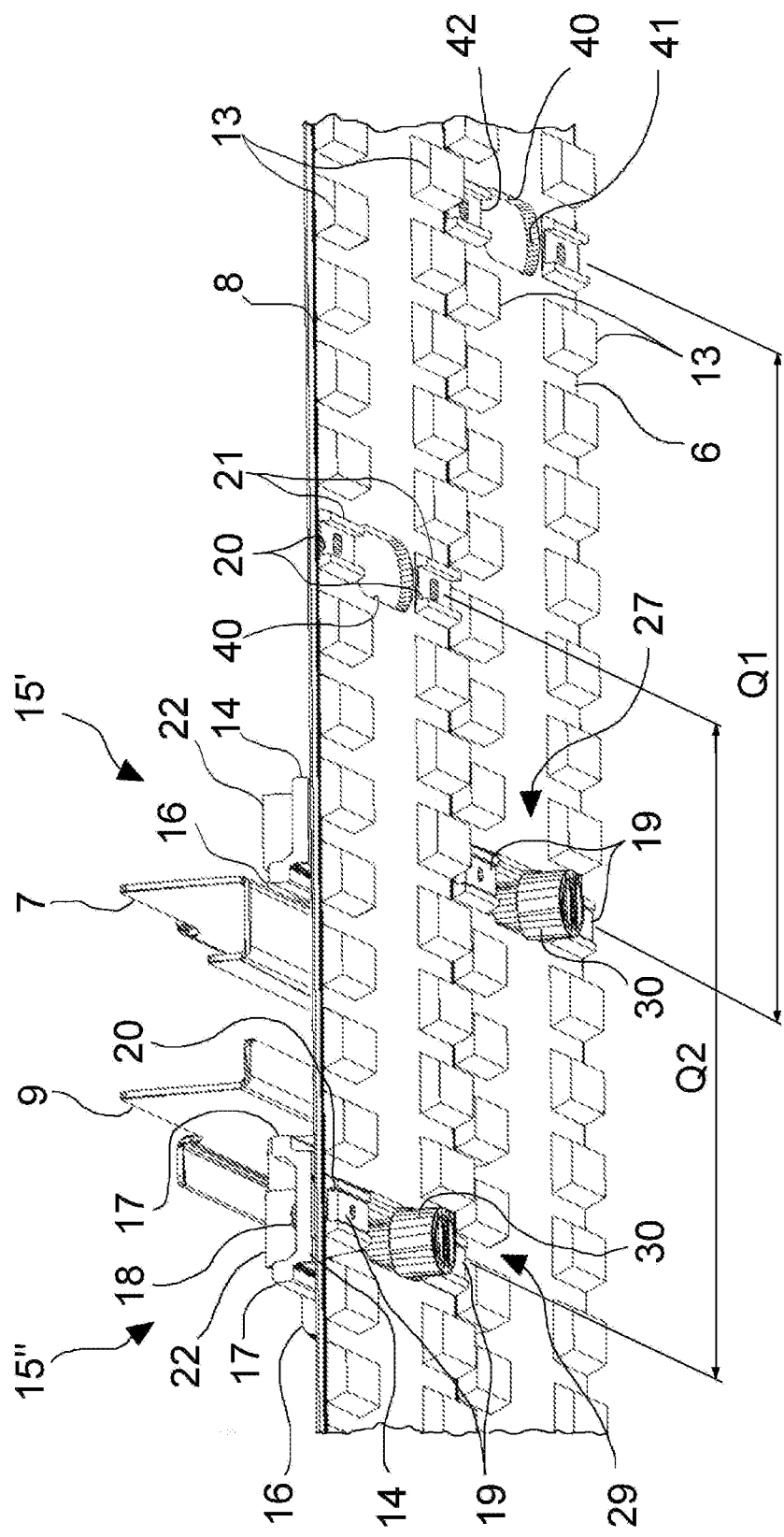
FIG. 4 is an enlarged and fragmentary perspective bottom view of the portion of the product conveyor of FIG. 3.

With reference to FIGS. 3 and 4, the first edge 7 and the second edge 9 are mounted respectively on the first belt 6 and on the second belt 8 by respective supporting units 15', 15". The supporting units 15', 15" are substantially the same as one another and are mounted rotated 180° with respect to an axis that is orthogonal to the external surface of the belts 6, 8. Each supporting unit 15', 15" is provided with a supporting body 22 on which slider elements 16 are mounted that are slidable on guides 17 provided in a fixing base 14 resting on the belts 6, 8. Below the belts 6, 8 there are provided abutting members 19 endowed with threaded holes that are not illustrated with which fixing screws 18 engage to retain the fixing base 14 against the respective belt 6, 8. Naturally, the belts 6, 8 have holes aligned with the threaded holes of the abutting members 19. Each abutting member 19 is received in a cavity 20 obtained within the thickness of a tooth of the belt 6, 8. In particular, with reference to FIG. 4, the abutting members 19 are two for each fixing base 14 and are received in two cavities 20 aligned and obtained in two aligned teeth 21 of the rows of teeth 13. The pitch Q1 between two consecutive first edges 7 is thus the same as the distance between two pairs of consecutive cavities 20 along the longitudinal extent of the first belt 6; similarly, the pitch Q2 between two second edges 9 is the same as the distance between two pairs of consecutive cavities 20 on the second belt 8.

Each first edge 7 includes a first cam follower 27 and each second edge 9 includes a second cam follower 29. The first cam follower 27 and the second cam follower 29 include a cursor 30 or a roller, connected to the supporting body 22 and which extends through a slot, which is not shown, obtained in the fixing base 14 and a corresponding slot 40 obtained on each belt 6, 8 in the zone of the belt 6, 8 included between the two aligned teeth 21 via which the fixing base 14 is mounted. The slot 40 has a major axis that is parallel to the removal T1 and approach T2 directions and includes an end region 41 that is more distant from the transport path B of the cartons 2 and a further end region 42 that is nearer the transport path B.

The supporting body 22, and consequently the edge 7, 9, can slide along the guides 17 between a retracted position, in which the cursor 30 is nearer the end 41 and the edge 7, 9 is more distant from the carton 2, and an advanced position in which the cursor 30 is nearer the further end 42 and the edge 7, 9 is nearer the carton 2.

Figure 6:
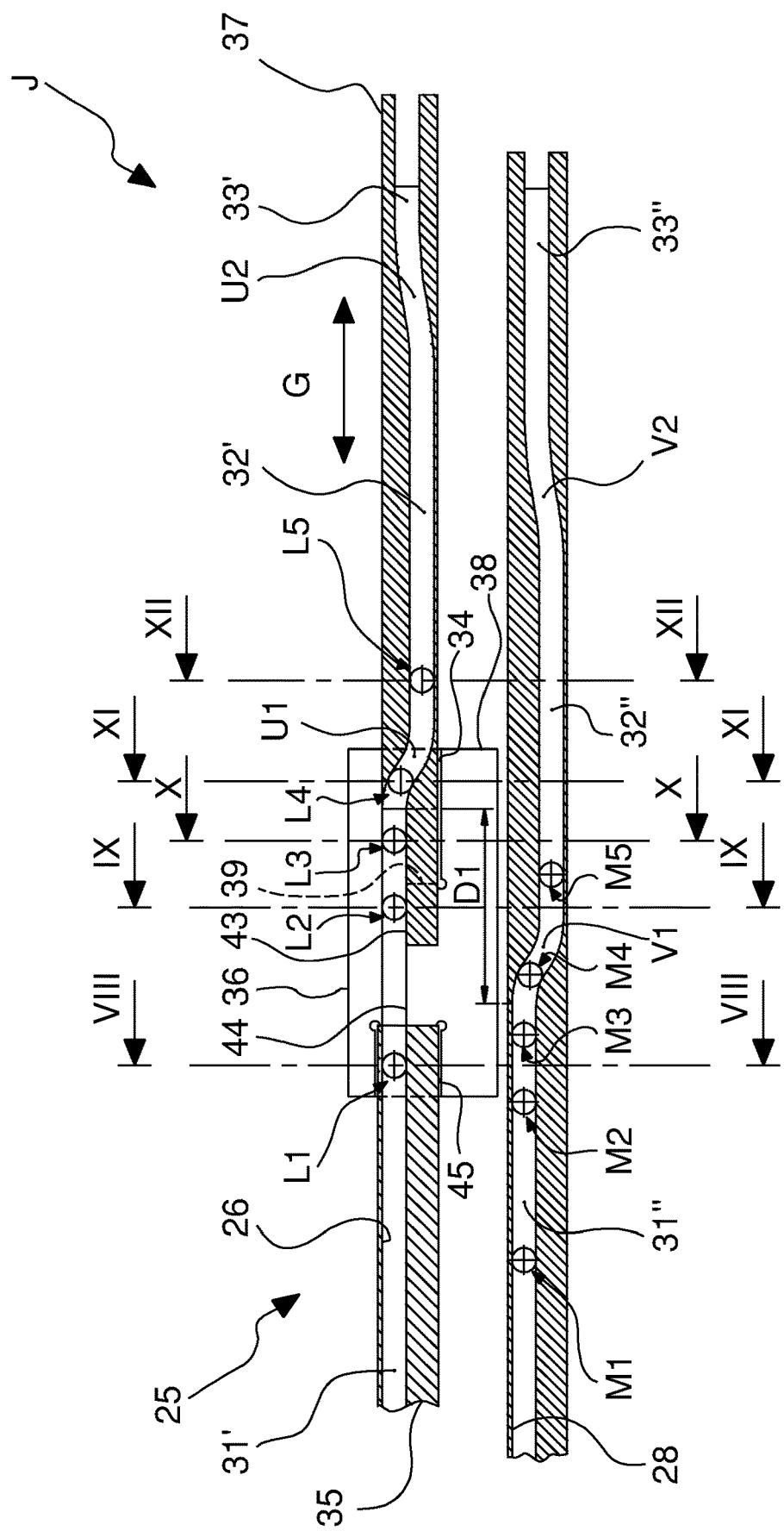
FIG. 6 and FIG. 7 are longitudinal sections of the arrangement of cams of FIG. 5 in two different positions, respectively.

During the motion of the product conveyor 5 along the advancement direction A, the first edge 7 and the second edge 9 are driven to move along the approach direction T1 or the removal direction T2 by a cam arrangement 25 (FIGS. 5-7) provided in the product conveyor 5.

The cam arrangement 25 includes a first cam path 26 for guiding the first edges 7 and a second cam path 28 for guiding the second edges 9. The two cam paths 26, 28 extend respectively below the upper stretch of the first belt 6 and of the second belt 8 at the interspace between the rows of teeth 13 of each of the belts 6, 8. The first cam path 26 and the second cam path 28 have the shape of a channel, bounded by parallel side walls. The first cam follower 27 engages the first earn path 26 and the second cam follower 29 engages the second cam path 28. During the advancement of the belts 6, 8 along the advancement direction A, the first cam follower 27 and the second cam follower 29 run within the respective cam path 26, 28.

As the first cam follower 27 runs within the first cam path 26 and second earn follower 29 runs within the second cam path 28, the first edges 7 are moveable transversely to the advancement direction A independently of the second edges 9 and vice versa. The first cam path 26 and the second earn path 28 are shaped far moving together, i.e. at the same time, the first edge 7 and the second edge 9 to the carton 2 along the approach direction T1 to the insertion zone I.

The first cam path 26 and the second cam path 28 include three rectilinear portions 31', 31", 32', 32", 33', 33", which are consecutive and parallel to one another and to the advancement direction A, and two curved portions U1, V1 and U2, V2. A first curved portion U1, V1 connects the first rectilinear portion 31', 31" and the second rectilinear portion 32', 32" whereas a second curved portion U2, V2 connects the second rectilinear portion 32', 32" and the third rectilinear portion 33', 33". The second rectilinear portion 32', 32" is nearer the transport path B of the cartons 2 than the other two portions 31', 31" and 33', 33, whereas the first rectilinear portion 31', 31" is the furthest from the transport path B.

The length of the second rectilinear portions 32', 32" is the same in the two cam paths 26 and 28, just as the first curved portions U1, V1 are the same as one another. Also the second curved portions U2, V2 can be the same as one another, if the two edges 7, 9 have to move away from the carton 2 at the same time. In order to enable the edges 7, 9 to move simultaneously to the carton 2, the first curved portions U1, V1, are staggered along the advancement direction A by a preset distance, for example D1, shown in FIG. 6, in which the cam arrangement 25 is in a configuration J. Accordingly, also the second rectilinear portions 32' and 32" and the second curved portions U2, V2 are staggered by the same preset distance.

The preset distance is established on the basis of the distance between the first edge 7 and the second edge 9 of each pair of containment edges 10 and can be adjusted to take account of an adjustment of the distance between the first edge 7 and the second edge 9 of the pair of containment edges 10.

Figure 10:
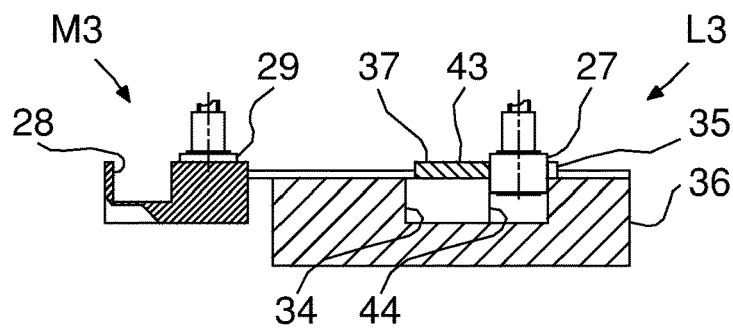
Figure 11:
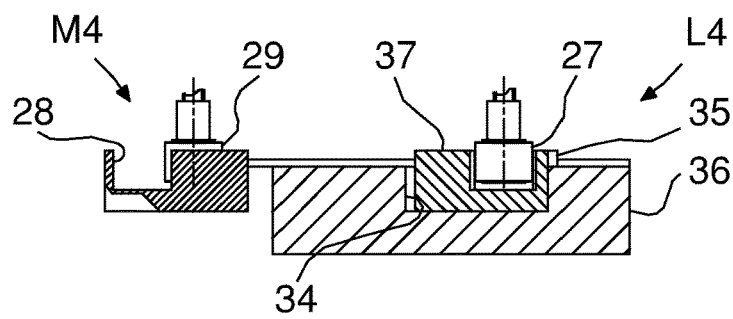
Figure 12:
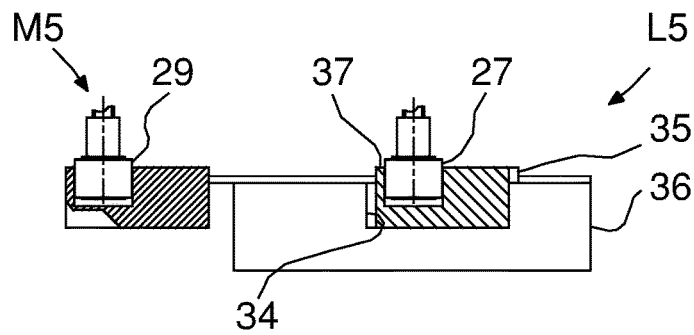

In order to enable the preset distance to be adjusted, the first cam path 26 is obtained on a plurality of cams comprising a fixed cam 35 and an adjustable cam 37, having a position that is adjustable linearly and parallel to the advancement direction A with respect to the fixed cam 35, as indicated by the arrow G. The plurality of cams further includes a joint cam 36, that joins the fixed earn 35 and the adjustable cam 37. The adjustable cam 37 can slide on the joint cam 36, in particular inside a channel 34 (FIGS. 10-12) provided in the joint cam 36 within which the adjustable cam 37 is received. The adjustable cam 37 can be locked by removable connecting elements, not shown, in a plurality of positions without interruptions between end positions substantially corresponding to ends of the channel 34. A first end of the channel 34 is bounded by an abutting wall 39 defined by a protrusion 44 provided in the joint cam 36. At a second end of the channel 34, opposite the first end, an end wall 38 of the joint cam 36 is defined.

Naturally, once the position of the adjustable cam 37 has been adjusted, it is locked in that position during normal operation of the cartoning machine 1.

The joint cam 36 further includes a seat 45 that is suitable for receiving an end part of the fixed cam 35 with which the latter is fixed to the joint cam 36 by removable fastenings that are not shown.

Figure 7:
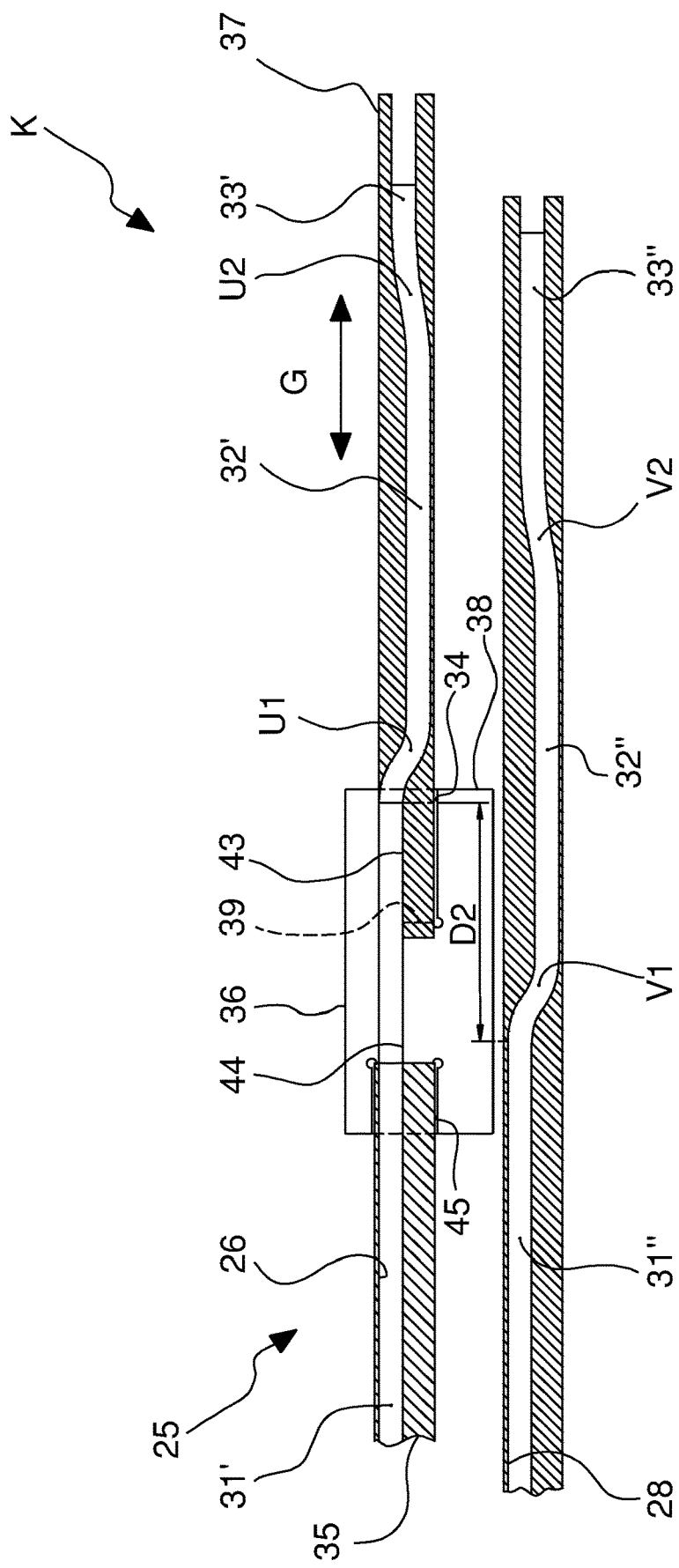
Figure 8:
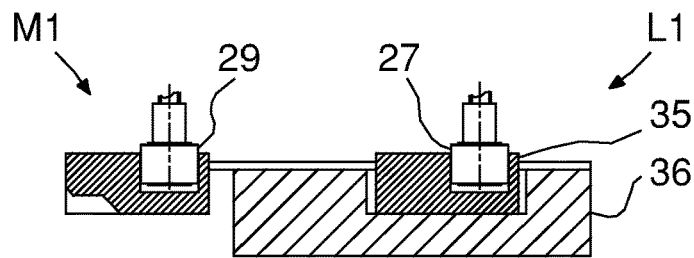
FIGS. 8 to 12 are enlarged sections of the cams of FIG. 6 taken along the respective planes VIII-VIII to XII-XII, respectively.
Figure 9:
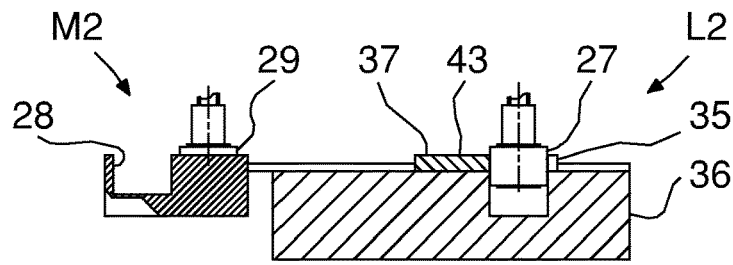

FIG. 7 shows a further configuration K of the cam arrangement 25 wherein the distance between the first curved portions U1, V1 is equal to D2, D2 being greater than D1.

In a step of adjusting the cartoning machine 1, once the position of the first belt 6 with respect to the second belt 8 has been adjusted, the adjustable cam 37 is translated along the direction G parallel to the advancement direction A and is locked in a corresponding position that enables the first edge 7 and the second edge 9 to move at the same time to the carton 2 along the approach direction T1.

The adjustable cam 37 includes the first curved portion U1 of the first cam path 26. Further, the adjustable cam 37 includes the second rectilinear portion 32' and the second curved portion U2. The fixed cam 35 is rectilinear and includes a part of the first rectilinear portion 31'. The joint cam 36 is also rectilinear and includes a further part of the first rectilinear portion 31' of the first cam path 26.

During adjustment, by making the adjustable cam 37 slide on the joint cam 36, the position of the first curved portion U1 with respect to the first curved portion V1 is modified. Accordingly, also the further part of the first rectilinear portion 31' that is part of the joint cam 36 varies in length. If, for example, the distance between the edges 6, 8 is increased, the first curved portion U1 is placed at a greater distance from the first curved portion V1 and the first rectilinear portion 31' becomes longer. In this way, the first cam follower 27 comes into contact with the first curved portion U1 after a greater time, at the same speed, during operation of the cartoning machine 1. This enables the first edge 6 to be guided by the first curved portion U1 along the approach direction T1 even when the second edge 8 has reached the first curved portion V1.

With reference to FIGS. 8 to 12, successive positions L1-L5 are shown of the first cam follower 27 and corresponding positions M1-M5 of the second cam follower 29 adopted respectively by the first cam follower 27 and by the second cam follower 29 during the motion of the product conveyor 5 in successive moments. Each cursor 30 of the first cam follower 27 and of the second cam follower 29 is guided by the side walls of the cam paths 26 and 28. The fixed cam 35, the adjustable cam 36 and the joint cam have a respective bottom that does not come into contact with the cursor 30. The portion of the first cam path 26 that extends in the joint cam 36, i.e. the further part of the first rectilinear portion 31', has a bottom at a lower height than the bottoms of the fixed cam 35 and of the adjustable cam 37. The side walls of the fixed cam 35, of the joint cam 36 and of the adjustable cam 37 have suitable heights so that the cursor 30 is always guided laterally.

When the side walls of the fixed cam 35 end, the guide walls of the joint cam 36 start. The adjustable cam 37 includes an overhang 43 arranged above the protrusion 44 of the joint cam 36 and which defines a portion of rectilinear side wall of the first rectilinear portion 31' to guide without interruptions the first cam follower 27 to the first curved portion U1.

The adjustable components disclosed above of the cartoning machine 1, i.e. the first belt 6 and the first cam path 26 are both arranged further from the transport device of the cartons 2. In embodiments that are not shown, such adjustable components can be arranged otherwise, for example both nearer the transport device of the cartons 2 or one nearer and the other more distant or vice versa.

Compared with cartoning machines of known type, the cartoning machine 1 is extremely flexible inasmuch as it can transport groups of products and be adjusted on the basis of the size of the product to be packaged. Further, the edges are brought near the carton so as to enable the product to be inserted in a guided and controlled manner.

The invention claimed is:

1. A cartoning machine for packaging one or more products in a respective carton, including: a product conveyor for conveying said products along an advancement direction, a transport device for transporting the carton along a transport path, an insertion zone where said one or more products are arranged in front of an aperture of the carton and are inserted in the carton, said product conveyor including a first belt having a plurality of first edges mounted thereon, and a second belt having a plurality of second edges mounted thereon, each first edge and a respective second edge defining a pair of containment edges of said one or more products, a mutual position of said first and second belts being adjustable to simultaneously adjust a distance between the first and second edges for each pair of containment edges of said one or more products depending on a dimension of said one or more products, wherein said product conveyor further includes a first cam path and a second cam path, each first edge including a first cam follower engaging said first cam path and each second edge including a second cam follower engaging said second cam path, so that the first edges and the second edges are movable transversely relative to said advancement direction towards the carton at the insertion zone, to shorten a distance of the first and second edges, respectively, from the aperture of the carton at the insertion zone and favour a correct insertion of said one or more products in the carton.

2. The cartoning machine according to claim 1, wherein the first cam path and the second cam path are shaped to move the first edge and the second edge of the pair of containment edges of said one or more products together towards the carton at the insertion zone.

3. The cartoning machine according to claim 2, wherein a rectilinear portion and a curved portion of the first cam path are parallel to a rectilinear portion and a curved portion of the second cam path, respectively, said rectilinear portion of the first cam path and said rectilinear portion of the second cam path being closer to the transport path of the cartons than other portions of the first cam path and of the second cam path.

4. The cartoning machine according to claim 3, wherein the first cam path is defined by a plurality of cams including a fixed cam and an adjustable cam having a position linearly adjustable with respect to said fixed cam and parallel to the advancement direction.

5. The cartoning machine according to claim 4, wherein the position of the adjustable cam is adjusted according to the relative positions of the first belt and of the second belt.

6. The cartoning machine according to claim 4, wherein the plurality of cams further includes a joint cam that joins the fixed cam and the adjustable cam.

7. The cartoning machine according to claim 6, wherein the adjustable cam includes the curved portion of the first cam path.

8. The cartoning machine according to claim 7, wherein the joint cam includes a part of the first rectilinear portion of the first cam path, said part being adjacent to the curved portion of the first cam path.

9. The cartoning machine according to claim 1, including fixing bases bearing on the first belt and on the second belt, respectively, each of said fixing bases including a guide, the first edges and the second edges being slidably mounted on said guides, respectively.

10. The cartoning machine according to claim 1, wherein the first cam path and the second cam path extend to an upper stretch of the first belt and to an upper stretch of the second belt, respectively.

11. The cartoning machine according to claim 10, wherein the first cam follower and the second cam follower each include a slider that projects from the first edge and from the second edge to the first belt and to the second belt, respectively, through slots arranged in the first belt and in the second belt, respectively.

12. The cartoning machine according to claim 1, including first pulleys on which the first belt is wound and second pulleys on which the second belt is wound, said first pulleys and said second pulleys being mutually angularly adjustable to simultaneously adjust a distance between the first edges and the second edges for each pair of containment edges of said one or more products.

13. A cartoning machine for packaging one or more products in a respective carton, including; a product conveyor for conveying said products along an advancement direction, a transport device for transporting the carton along a transport path, an insertion zone where said one or more products are arranged in front of an aperture of the carton and are inserted in the carton, said product conveyor including a first belt having a plurality of first edges mounted thereon, and a second belt having a plurality of second edges mounted thereon, each first edge and a respective second edge defining a pair of containment edges of said one or more products, a mutual position of said first and second belts being adjustable to simultaneously adjust a distance between the first and second edges for each pair of containment edges of said one or more products depending on a dimension of said one or more products, wherein said product conveyor further includes a first cam path and a second cam path, each first edge including a first cam follower engaging said first cam path and each second edge including a second cam follower engaging said second cam path, so that the first edges and the second edges are movable transversely relative to said advancement direction towards the carton at the insertion zone, to shorten a distance of the first and second edges, respectively, from the aperture of the carton at the insertion zone and favour a correct insertion of said one or more products in the carton; wherein the first cam path is defined by a plurality of cams including a fixed cam and an adjustable cam having a position linearly adjustable with respect to said fixed cam and parallel to the advancement direction.

14. The cartoning machine according to claim 13, wherein the position of the adjustable cam is adjusted according to the relative positions of the first belt and of the second belt.

15. The cartoning machine according to claim 13, wherein the plurality of cams further includes a joint cam that joins the fixed cam and the adjustable cam.

* * * * *